(12) United States Patent
Liu et al.

(10) Patent No.: US 11,700,381 B2
(45) Date of Patent: Jul. 11, 2023

(54) OVERLAPPED BLOCK MOTION COMPENSATION USING SPATIAL NEIGHBORS

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/173,734

(22) Filed: Feb. 11, 2021

(65) Prior Publication Data
US 2021/0176472 A1    Jun. 10, 2021

Related U.S. Application Data

(63) Continuation of application No. PCT/IB2019/057138, filed on Aug. 26, 2019.

(30) Foreign Application Priority Data

Aug. 24, 2018   (WO) .............. PCT/CN2018/102163

(51) Int. Cl.
  *H04N 19/139*   (2014.01)
  *H04N 19/107*   (2014.01)
  (Continued)

(52) U.S. Cl.
  CPC ......... *H04N 19/139* (2014.11); *H04N 19/105* (2014.11); *H04N 19/107* (2014.11);
  (Continued)

(58) Field of Classification Search
  None
  See application file for complete search history.

(56) References Cited

U.S. PATENT DOCUMENTS

| 10,230,980 B2 | 3/2019 | Liu et al. |
| 10,771,811 B2 | 9/2020 | Liu et al. |

(Continued)

FOREIGN PATENT DOCUMENTS

| CN | 102113326 A | 6/2011 |
| CN | 107211157 A | 9/2017 |
| WO | 2018101700 A1 | 6/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE2: Report of OBMC with Motion Merging," Joint Collaborative Team on Video Coding (JCT-VC) of ITU-T SG16 WP3 and ISO/IEC JTC1/SC29/WG11 6th Meeting, Torino, IT, Jul. 14-22, 2011, document JCTVC-F049, 2011.

(Continued)

*Primary Examiner* — Christopher G Findley
(74) *Attorney, Agent, or Firm* — Perkins Coie LLP

(57) ABSTRACT

Devices, systems and methods for digital video coding, which includes an overlapped block motion compensation (OBMC) process based on spatially neighboring blocks, are described. An exemplary method for video processing includes generating a motion information associated with a current video block; generating, based on a weighted sum of at least two temporary prediction blocks, a prediction block for the current video block, a first of the at least two temporary prediction blocks being based on the motion information, and a second of the at least two temporary prediction blocks being based on an intra prediction mode of a neighboring block; and performing, based on the prediction block, a conversion between the current video block and a bitstream representation of the current video block.

20 Claims, 24 Drawing Sheets

(51) Int. Cl.
  *H04N 19/176* (2014.01)
  *H04N 19/196* (2014.01)
  *H04N 19/513* (2014.01)
  *H04N 19/105* (2014.01)
  *H04N 19/137* (2014.01)
  *H04N 19/159* (2014.01)
  *H04N 19/31* (2014.01)
  *H04N 19/51* (2014.01)
(52) U.S. Cl.
  CPC ......... *H04N 19/137* (2014.11); *H04N 19/159* (2014.11); *H04N 19/176* (2014.11); *H04N 19/196* (2014.11); *H04N 19/31* (2014.11); *H04N 19/51* (2014.11); *H04N 19/521* (2014.11)

(56) References Cited

U.S. PATENT DOCUMENTS

| | | | |
|---|---|---|---|
| 2011/0142132 | A1 | 6/2011 | Tourapis et al. |
| 2012/0099652 | A1 | 4/2012 | Woods et al. |
| 2016/0219302 | A1* | 7/2016 | Liu .................. H04N 19/583 |
| 2019/0297325 | A1* | 9/2019 | Lim .................. H04N 19/119 |
| 2020/0053364 | A1* | 2/2020 | Seo .................. H04N 19/70 |
| 2021/0195205 | A1 | 6/2021 | Liu et al. |

OTHER PUBLICATIONS

JEM-7.0: https://jvet.hhi.fraunhofer.de/svn/svn_HMJEMSoftware/tags/ HM-16.6-JEM-7.0.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

"High Efficiency Video Coding" Series H: Audiovisual and Multimedia Systems: Infrastructure of Audiovisual Services—Coding of Moving Video, ITU-T, H.265, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

International Search Report and Written Opinion from International Patent Application No. PCT/IB2019/057138 dated Jan. 28, 2020 (20 pages).

International Search Report and Written Opinion from International Patent Application No. PCT/IB2019/057140 dated Nov. 26, 2019 (88 pages).

Non-Final Office Action from U.S. Appl. No. 17/173,601 dated Aug. 4, 2022.

* cited by examiner

2030 ─→

2032 — Generating, based on a weighted sum of a at least two temporary prediction blocks, a prediction block for a current video block, a first of the at least two temporary prediction blocks being based on an intra prediction mode of the current video block, and a second of the at least two temporary prediction blocks being based on a motion information associated with at least one neighboring block

2034 — Performing, based on the prediction block, a conversion between the current video block and a bitstream representation of the current video block

2062 — Generating, based on a weighted sum of a first prediction sample and a second prediction sample, a prediction block, the first prediction sample being based on a first motion information associated with a current video block, the second prediction sample being based on a second motion information associated with at least one neighboring block of the current video block, and a weighting factor of the second prediction sample being based on a difference between the first prediction sample and the second prediction sample 2064 — Performing, based on the prediction block, a conversion between the current video block and a bitstream representation of the current video block

FIG. 20C

OVERLAPPED BLOCK MOTION COMPENSATION USING SPATIAL NEIGHBORS

CROSS REFERENCE TO RELATED APPLICATIONS

This application is a continuation application of International Application No. PCT/IB2019/057138 filed on Aug. 26, 2019, which claims the priority to and benefits of International Patent Application No. PCT/CN2018/102163, filed on Aug. 24, 2018. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to an overlapped block motion compensation (OBMC) process based on spatially neighboring blocks are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes generating a motion information associated with a current video block; generating, based on a weighted sum of at least two temporary prediction blocks, a prediction block for the current video block, a first of the at least two temporary prediction blocks being based on the motion information, and a second of the at least two temporary prediction blocks being based on an intra prediction mode of a neighboring block; and performing, based on the prediction block, a conversion between the current video block and a bitstream representation of the current video block.

In another representative aspect, the disclosed technology may be used to provide a method for video processing. This method includes generating, based on a weighted sum of a at least two temporary prediction blocks, a prediction block for a current video block, a first of the at least two temporary prediction blocks being based on an intra prediction mode of the current video block, and a second of the at least two temporary prediction blocks being based on a motion information associated with at least one neighboring block; and performing, based on the prediction block, a conversion between the current video block and a bitstream representation of the current video block.

In yet another representative aspect, the disclosed technology may be used to provide a method for video processing. This method includes generating, based on a weighted sum of a first prediction sample and a second prediction sample, a prediction block, the first prediction sample being based on a first motion information associated with a current video block, the second prediction sample being based on a second motion information associated with at least one neighboring block of the current video block, and a weighting factor of the second prediction sample being based on a difference between the first prediction sample and the second prediction sample; and performing, based on the prediction block, a conversion between the current video block and a bitstream representation of the current video block.

In some embodiments, the methods preferably include a current prediction unit (PU) or coding unit (CU), comprising the current video block, being coded with an inter prediction mode, and the at least one neighboring block being coded with the intra prediction mode.

In some embodiments, the methods preferably include a current prediction unit (PU) or coding unit (CU), comprising the current video block, being coded with the intra prediction mode, and the at least one neighboring block being coded with an inter prediction mode.

In some embodiments, the methods preferably include a current prediction unit (PU) or coding unit (CU), comprising the current video block, being coded with the intra prediction mode, and the at least one neighboring block being coded with another intra prediction mode.

In some embodiments, the methods preferably include a weighting factor for the first prediction sample or the weighting factor for the second prediction sample being selected from a predefined weighting factor set.

In some embodiments, the methods preferably include the predefined weighting factor set being $\{1/32, 1/16, 1/8, 1/4, 1/2\}$.

In some embodiments, the methods preferably include the weighting factor for the second prediction sample being increased to $1/2$ upon a determination that the difference between the first prediction sample and the second prediction sample is decreasing to zero.

In some embodiments, the methods preferably include a same weighting factor being assigned to a group of pixels in the current video block.

In some embodiments, the methods preferably include the group of pixels comprising pixels in one or more columns of the current video block or pixels in one or more rows of the current video block.

In some embodiments, the methods preferably include the group of pixels being a subblock of the current video block, a size of the subblock being M×N, and M and N being positive integers.

In some embodiments, the methods preferably include the group of pixels comprising pixels with values in a range [Vmax, Vmin], and wherein Vmax and Vmin and positive integers.

In some embodiments, the methods preferably include each of the group of pixels being associated with a corresponding first prediction sample and a corresponding second prediction sample, and the group of pixels comprises pixels with the difference between the corresponding first prediction sample and the corresponding second prediction sample being within a range [Vmax, Vmin], and Vmax and Vmin being positive integers.

In some embodiments, the methods preferably include each of the group of pixels being associated with a corresponding first prediction sample and a corresponding second prediction sample, and the same weighting factor being based on an average value of the difference between the corresponding first prediction sample and the corresponding second prediction sample for all pixels in the group of pixels.

In some embodiments, the methods preferably include an absolute value of a difference between the first prediction sample and the second prediction sample being less than or equal to a threshold that is greater than zero.

In some embodiments, the methods preferably include a weighting factor for the first prediction sample or the weighting factor for the second prediction sample being based on a pixel position and a value of the difference between the first prediction sample and the second prediction sample.

In some embodiments, the methods preferably include the weighting factor of the second prediction sample being further based on a difference between the first motion information and the second motion information.

In some embodiments, the methods preferably include performing the conversion being based on a coding mode of the current video block, a size or a shape of the current video block, or a size of a sub-block of the current video block.

In some embodiments, the methods preferably include the coding mode of the current video block comprising a conventional translation motion with an affine mode being disabled.

In some embodiments, the methods preferably include a product of a height of the current video block and a width of a current video block being greater than or equal to a threshold.

In some embodiments, the methods preferably include a height of the current video block being greater than or equal to a first threshold, and a width of the current video block being greater than or equal to a second threshold.

In some embodiments, the methods preferably include performing the conversion being further based on a slice type of a slice comprising the current video block, a low-delay check flag or a temporal layer.

In some embodiments, the methods preferably include the performing the conversion comprising applying the motion compensation process on a luma component of the current video block.

In some embodiments, the methods preferably include the performing the conversion comprising applying the motion compensation process on one or more of a plurality of chroma components of the current video block.

In some embodiments, the methods preferably include performing the conversion being further based on signaling in a sequence parameter set (SPS), a picture parameter set (PPS), a video parameter set (VPS), a slice header, a coding tree unit (CTU), a coding unit (CU), a group of CTUs or a group of CUs.

In some embodiments, the methods preferably include the at least one neighboring block comprising four neighboring blocks.

In some embodiments, the methods preferably include the generating the prediction block being part of an overlapped block motion compensation (OBMC) process.

In some embodiments, the methods preferably include performing the conversion comprising generating the bitstream representation from the current video block.

In some embodiments, the methods preferably include performing the conversion comprising generating the current video block from the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 20A-20C show flowcharts of example methods for video processing.

DETAILED DESCRIPTION

Figure 1:
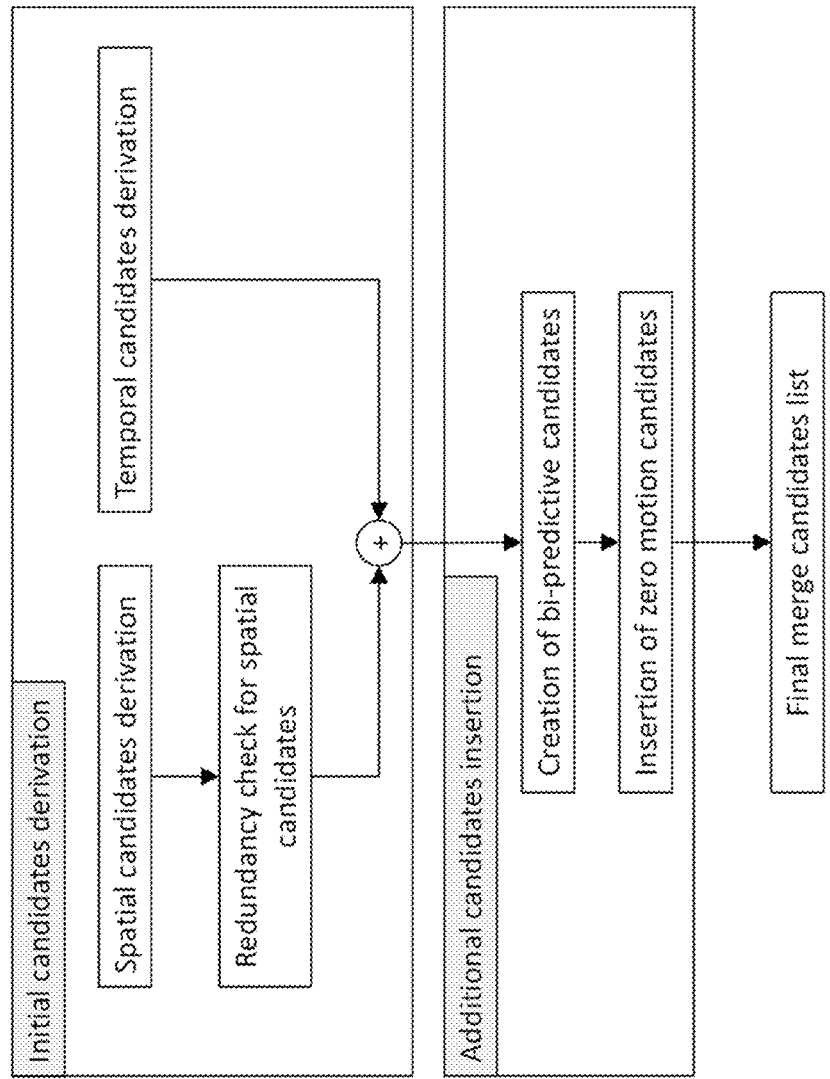
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
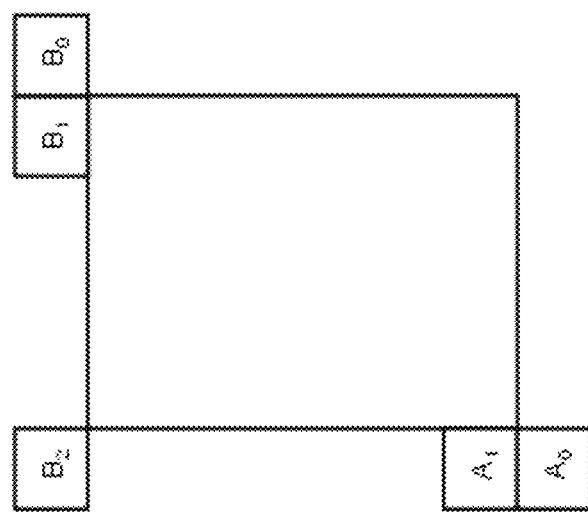
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
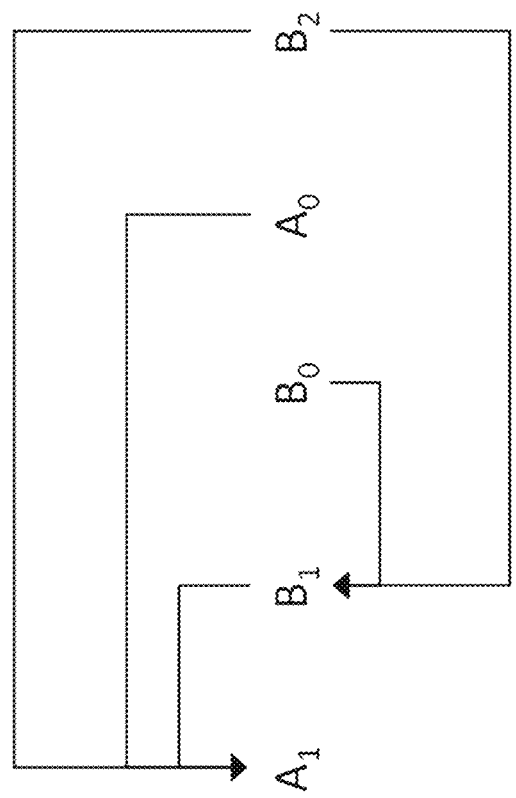
FIG. 3 shows an example of candidate pairs subject to a redundancy check of spatial merge candidates.
Figure 4B:
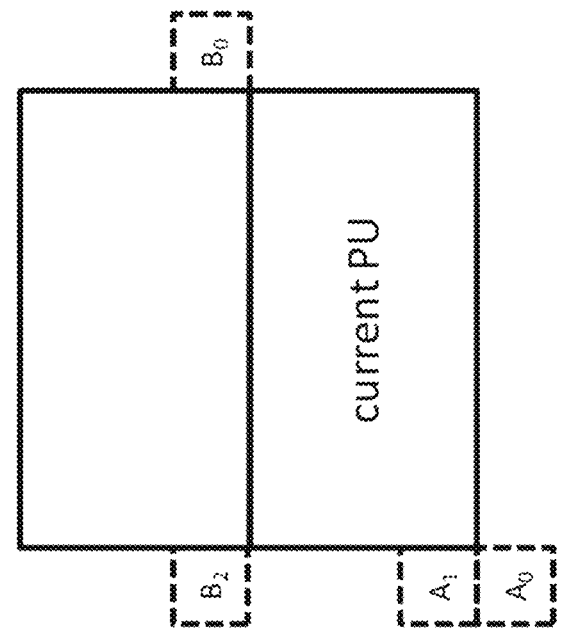
FIGS. 4A and 4B show examples of the position of a second prediction unit (PU) based on the size and shape of the current block.
Figure 4A:
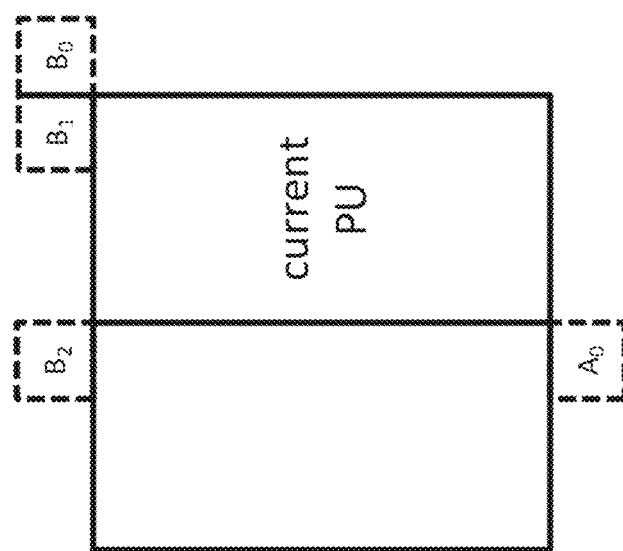

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
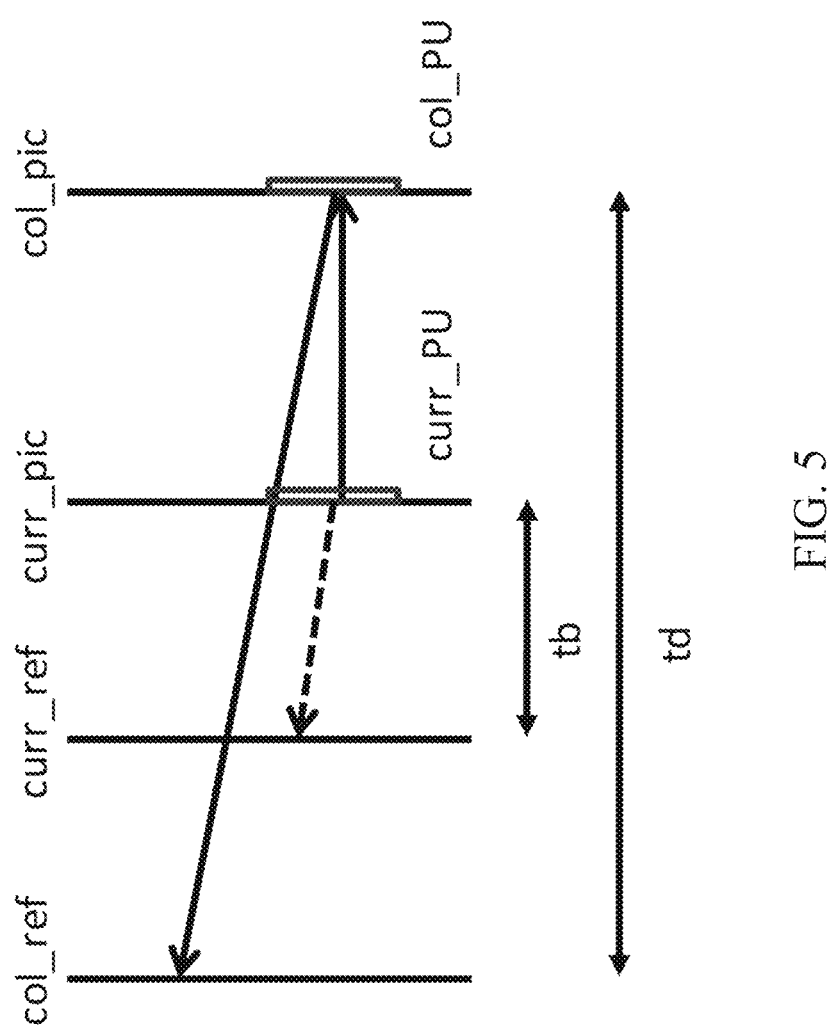
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
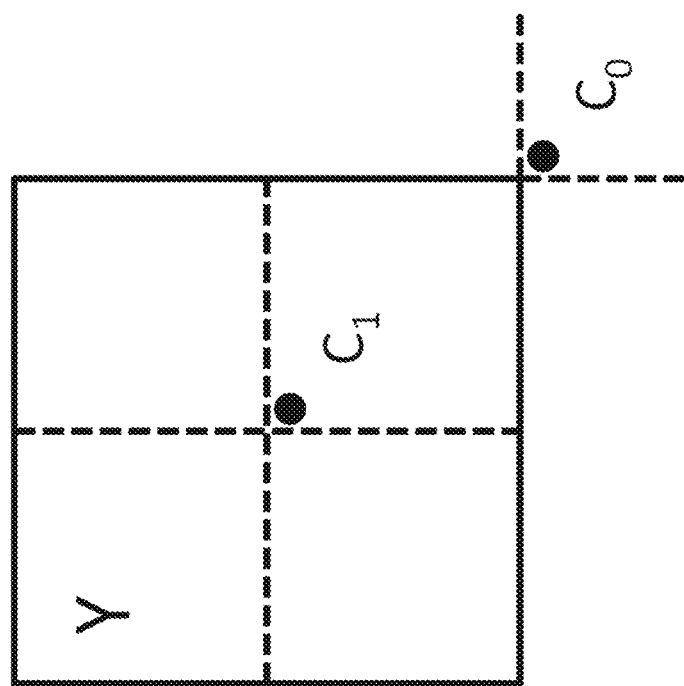
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing additional types of merge candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
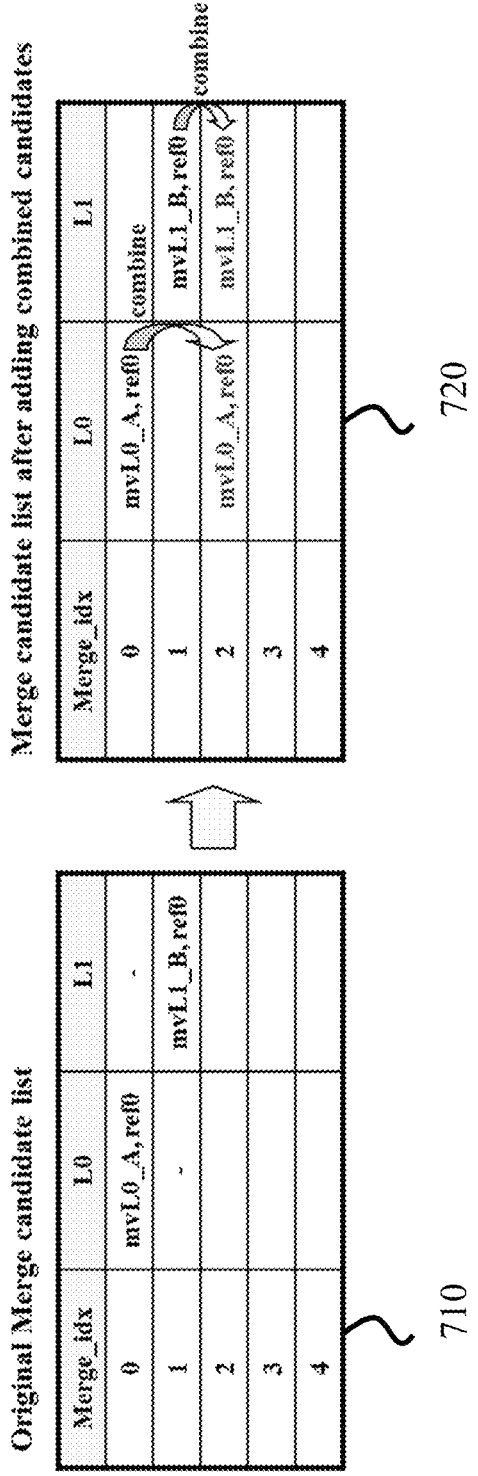
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of motion estimation regions for parallel processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
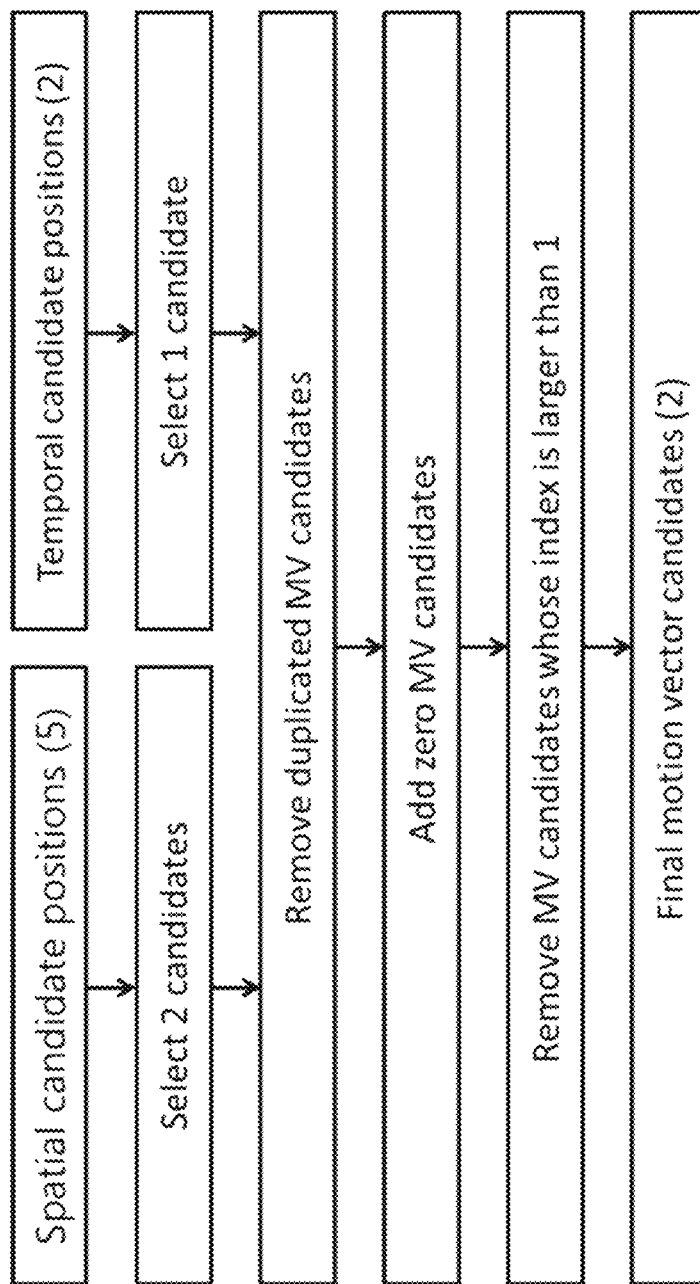
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
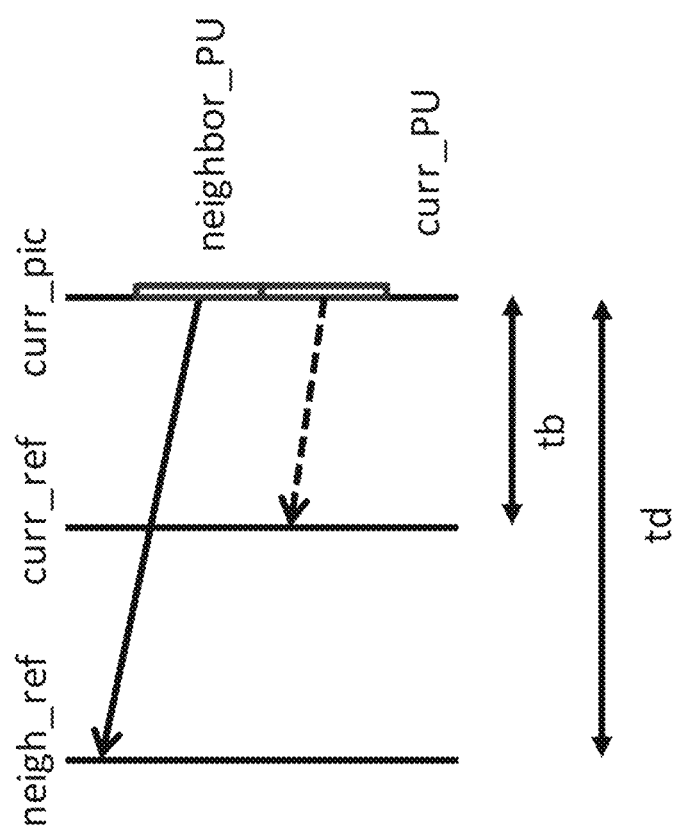
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
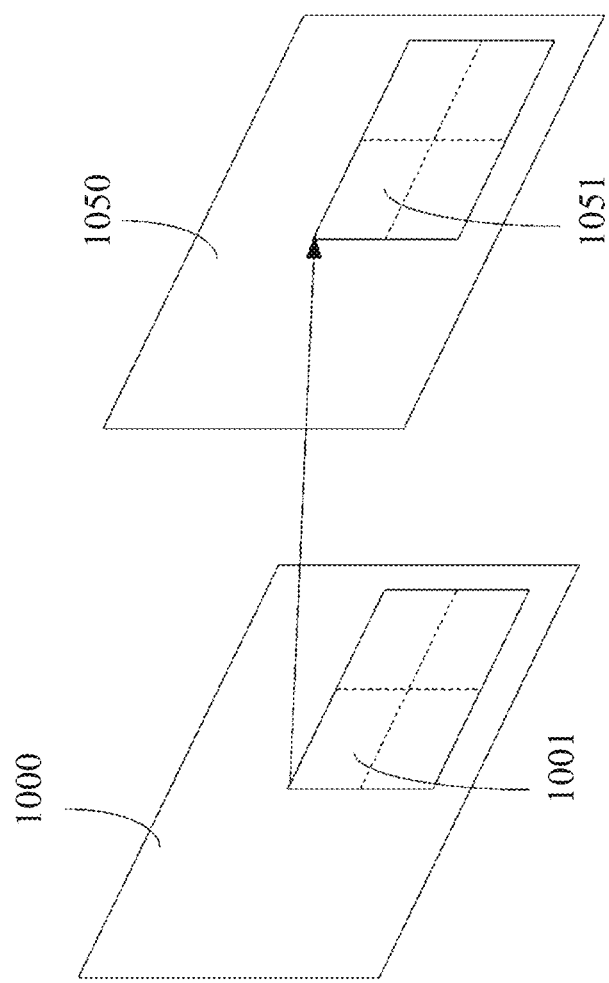
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1-X) for each sub-CU.

2.1.2 Examples of Spatial-Temporal Motion Vector Prediction (STMVP)

Figure 11:
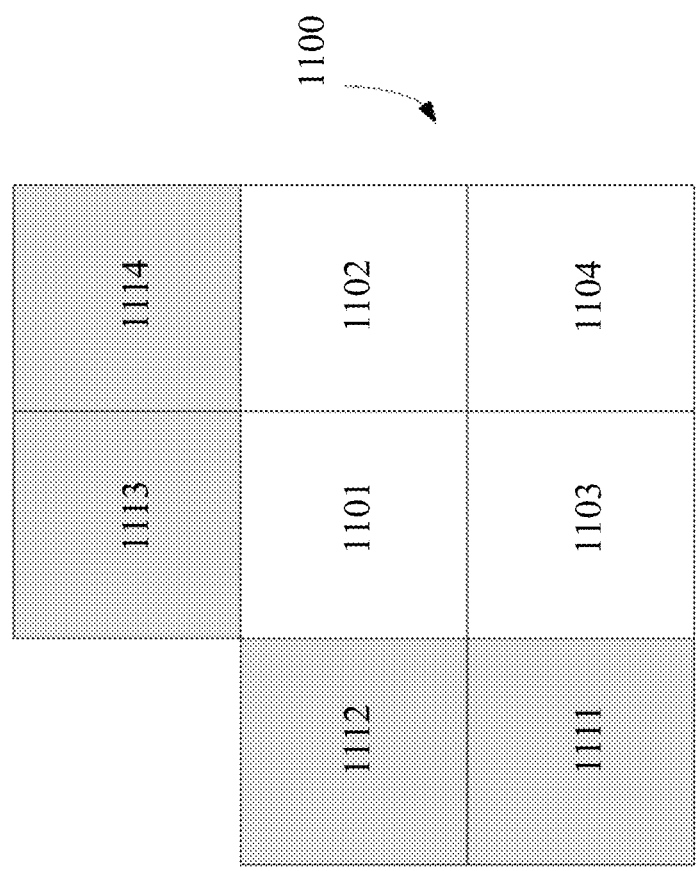
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
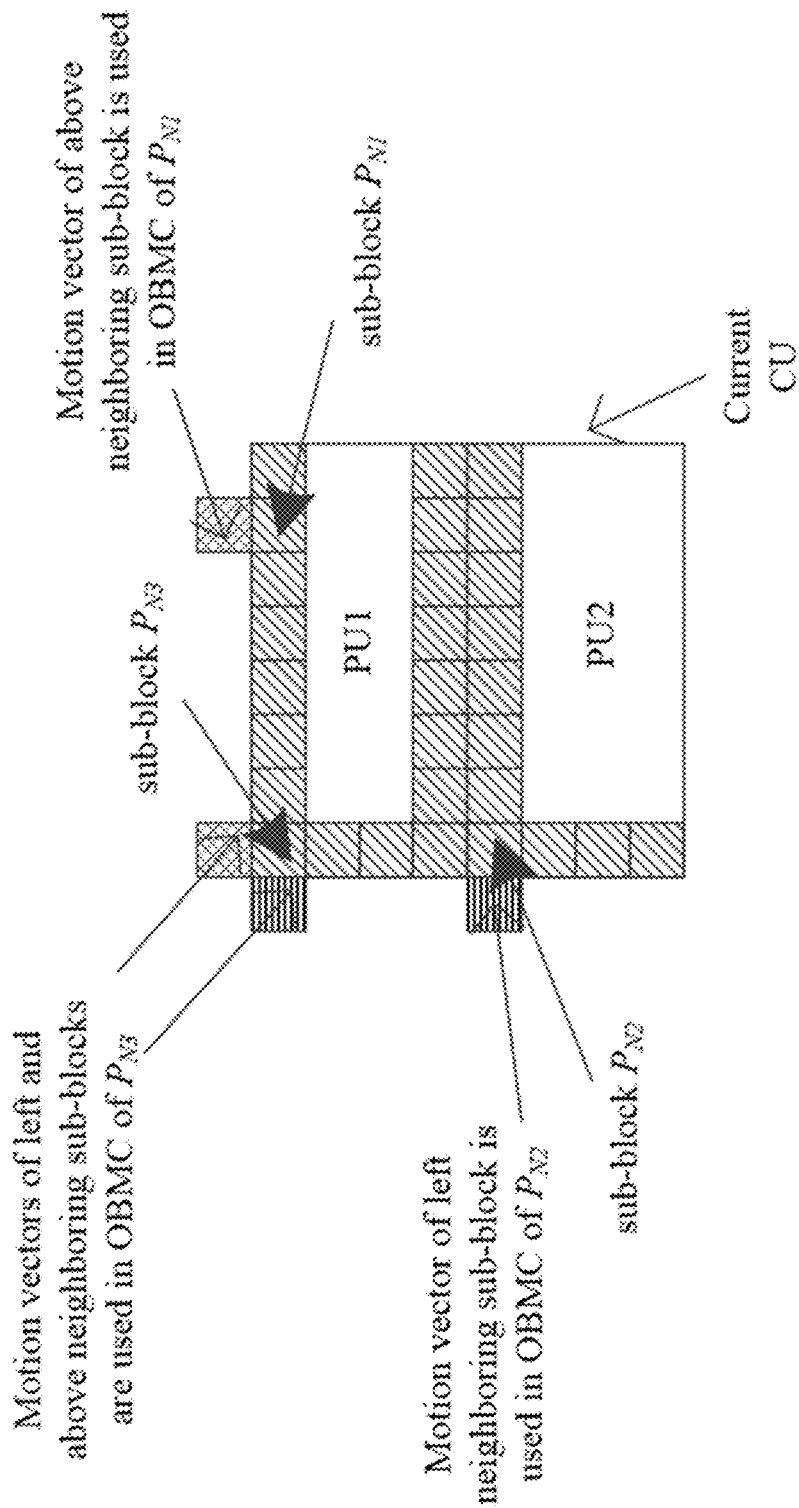
FIGS. 12A and 12B show example snapshots of sub-block when using the overlapped block motion compensation (OBMC) algorithm.
Figure 12B:
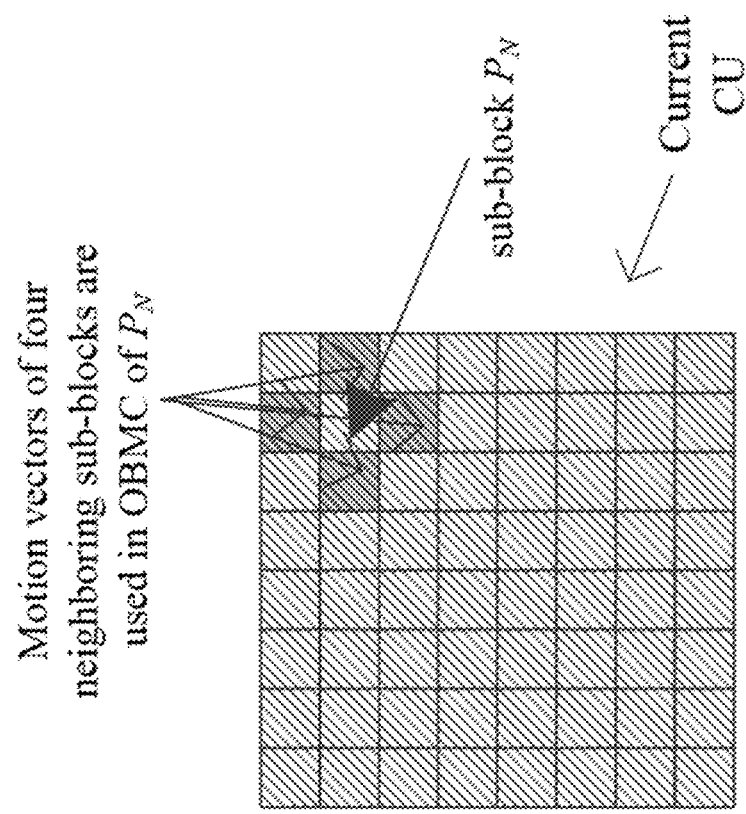

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Affine Motion Compensation Prediction

Figure 13:
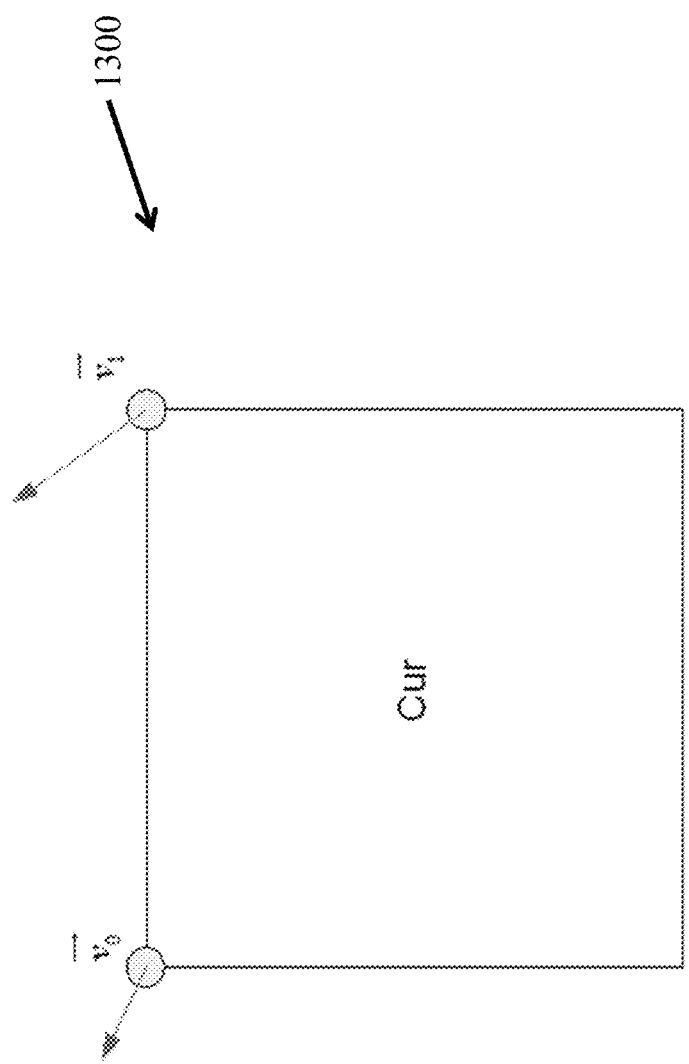
FIG. 13 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 13 shows an example of an affine motion field of a block 1300 described by two control point motion vectors $V_0$ and $V_1$. The motion vector field (MVF) of the block 1300 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 13, ($v_{0x}$, $v_{0y}$) is motion vector of the top-left corner control point, and ($v_{1x}$, $v_{1y}$) is motion vector of the top-right corner control point. To simplify the motion compensation prediction, sub-block based affine transform prediction can be applied. The sub-block size M×N is derived as follows:

$$\begin{cases} M = clip3\left(4, w, \dfrac{w \times MvPre}{\max(abs(v_{1x} - v_{0x}), abs(v_{1y} - v_{0y}))}\right) \\ N = clip3\left(4, h, \dfrac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). ($v_{2x}$, $v_{2y}$) is motion vector of the bottom-left control point, calculated according to Eq. (1). M and N can be adjusted downward if necessary to make it a divisor of w and h, respectively.

Figure 14:
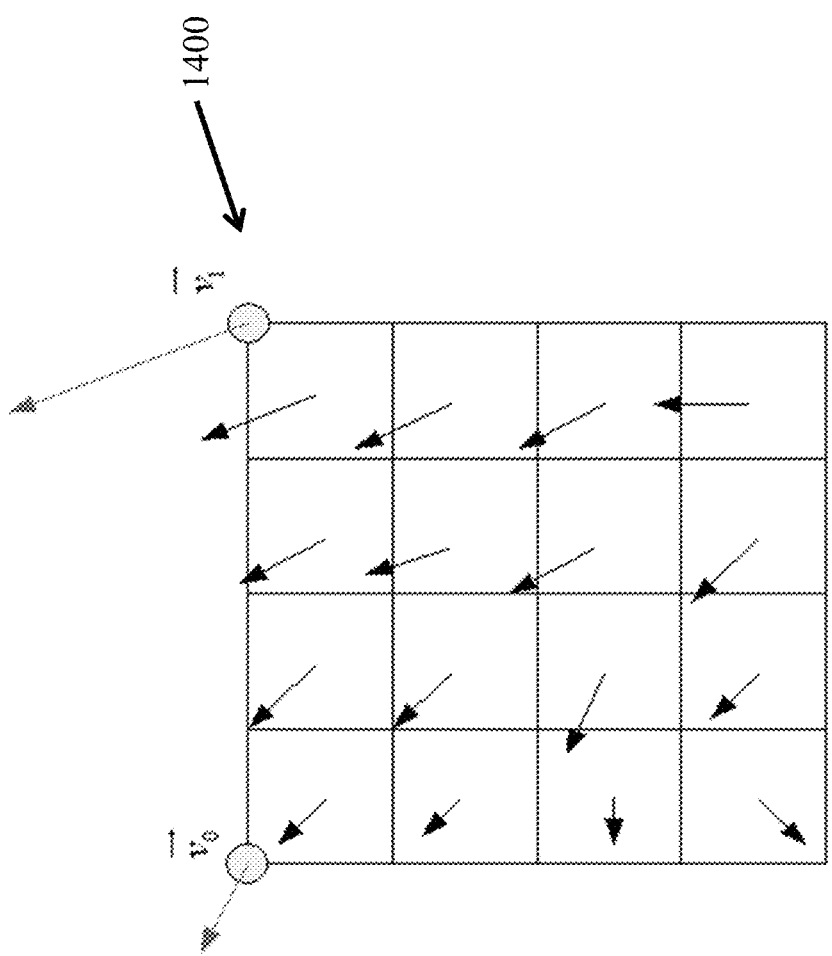
FIG. 14 shows an example of an affine motion vector field (MVF) per sub-block.

FIG. 14 shows an example of affine MVF per sub-block for a block 1400. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair {($v_0$, $v_1$)|$v_0$={$v_A$, $v_B$, $v_C$}, $v_1$×{$v_D$,$v_E$}} is constructed using the neighboring blocks.

Figure 15:
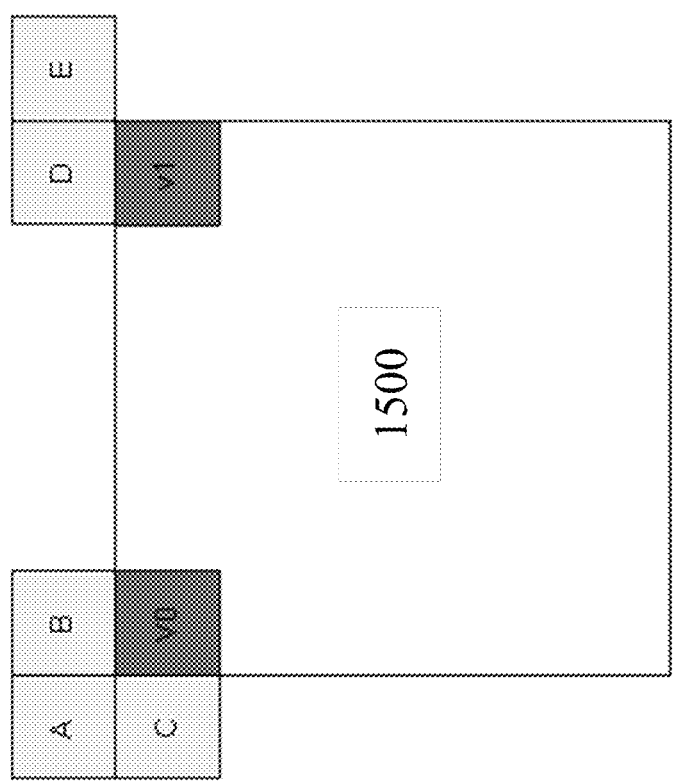
FIG. 15 shows an example of motion vector prediction (MVP) for the AF_INTER affine motion mode.

FIG. 15 shows an example of motion vector prediction (MVP) for a block 1500 in the AF_INTER mode. As shown in FIG. 15, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 16A:
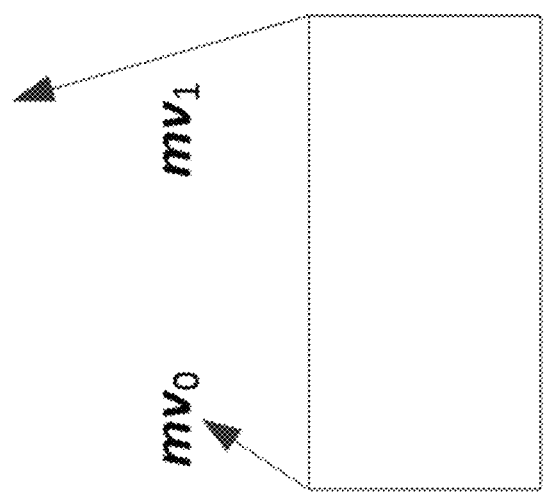
FIGS. 16A and 16B show examples of the 4-parameter and 6-parameter affine models, respectively.
Figure 16B:
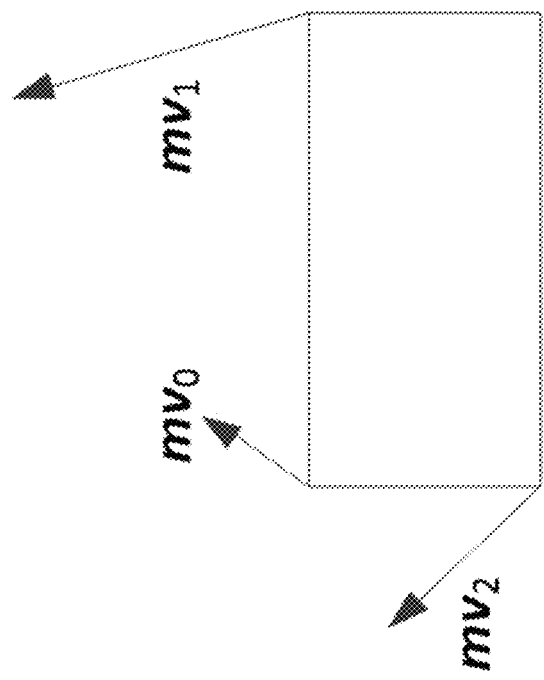

In AF_INTER mode, when 4/6 parameter affine mode is used, 2/3 control points are required, and therefore 2/3 MVD needs to be coded for these control points, as shown in FIGS. 16A and 16B, respectively. In an existing implementation, the MV may be derived as follows, e.g., it predicts $mvd_1$ and $mvd_2$ from $mvd_0$.

$$mv_0 = \overline{mv}_0 + mvd_0$$
$$mv_1 = \overline{mv}_1 + mvd_1 + mvd_0$$
$$mv_2 = \overline{mv}_2 + mvd_2 + mvd_0$$

In some embodiments, and at the encoder, MVD of AF_INTER are derived iteratively. If it is assumed that the MVD derivation process is iterated n times, then the final MVD is calculated as follows, wherein $a_i$ and $b_i$ are the estimated affine parameters, and $mvd[k]^h$ and $mvd[k]^v$ are the derived horizontal and vertical component of $mvd_k$ (k=0, 1) in the ith iteration.

$$mvd[1]^h = \sum_{i=0}^{n-1} mvd[1]_i^h = \sum_{i=0}^{n-1} (a_i * w + mvd[0]_i^h) = \quad \text{Eq. (3)}$$
$$\sum_{i=0}^{n-1} a_i * w + \sum_{i=0}^{n-1} mvd[0]_i^h = w * \sum_{i=0}^{n-1} a_i + mvd[0]^h$$

$$mvd[1]^v = \sum_{i=0}^{n-1} mvd[1]_i^v = \sum_{i=0}^{n-1} (-b_i * w + mvd[0]_i^v) = \quad \text{Eq. (4)}$$
$$-\sum_{i=0}^{n-1} b_i * w + \sum_{i=0}^{n-1} mvd[0]_i^v = -w * \sum_{i=0}^{n-1} b_i + mvd[0]^v$$

Thus, in this implementation, which predicts $mvd_1$ from $mvd_0$, only $$\left(w * \sum_{i=0}^{n-1} a_i, -w * \sum_{i=0}^{n-1} b_i\right)$$

is encoded for $mvd_1$.

Figure 17B:
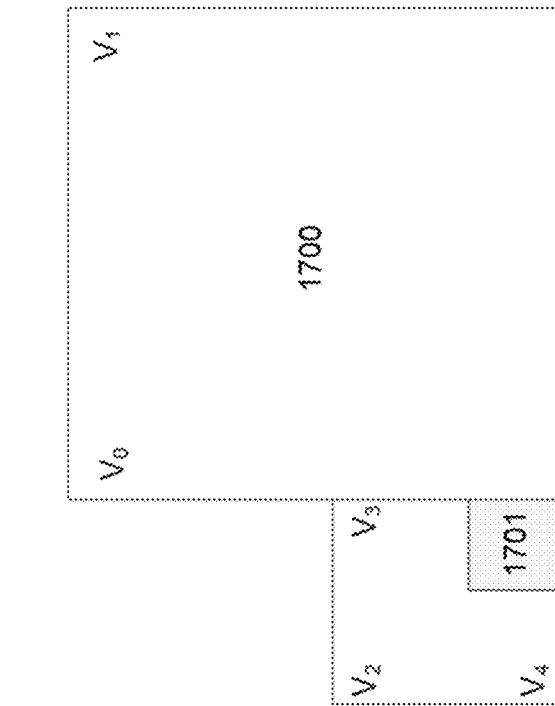
FIGS. 17A and 17B show example candidates for the AF_MERGE affine motion mode.
Figure 17A:
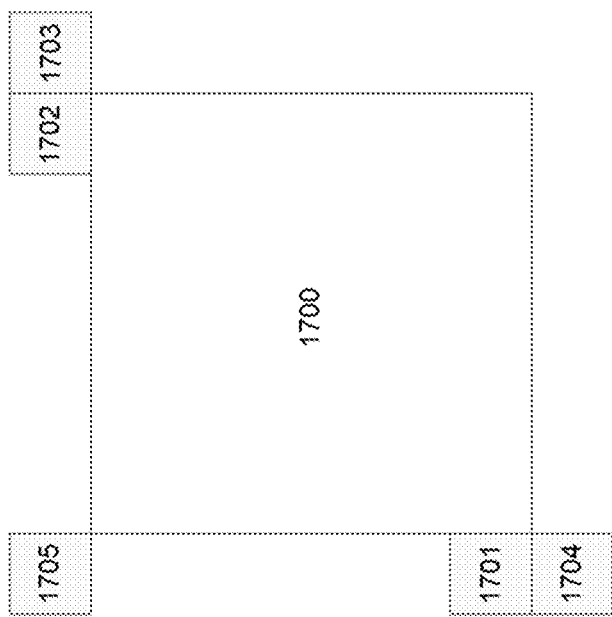

When a CU is applied in AF_MERGE mode, it gets the first block coded with an affine mode from the valid neighboring reconstructed blocks. FIG. 17A shows an example of the selection order of candidate blocks for a current CU 1700. As shown in FIG. 17A, the selection order can be from left (1701), above (1702), above right (1703), left bottom (1704) to above left (1705) of the current CU 1700. FIG. 17B shows another example of candidate blocks for a current CU 1700 in the AF_MERGE mode. If the neighboring left bottom block 1701 is coded in affine mode, as shown in FIG. 17B, the motion vectors $v_2$, $v_3$ and $v_4$ of the top left corner, above right corner, and left bottom corner of the CU containing the sub-block 1701 are derived. The motion vector $v_0$ of the top left corner on the current CU 1700 is calculated based on $v_2$, $v_3$ and $v_4$. The motion vector $v_1$ of the above right of the current CU can be calculated accordingly.

After the CPMV of the current CU $v_0$ and $v_1$ are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

3. Drawbacks of Existing Implementations

In one existing implementation of OBMC, fixed weighting factors are used for generating the prediction sample $P_N$ (prediction generated by using neighboring MV) and Pc (prediction generated by using current MV) when generating the final prediction. This may be problematic if $P_N$ and PC are dissimilar (e.g., in screen content coding), since a large difference may cause artifacts.

In another existing implementation, and for a PU/CU that is not coded with a sub-block mode, e.g., all sub-blocks within the PU/CU have identical motion information, OBMC cannot be performed for sub-blocks that are not at the left or above the PU/CU boundary. When neighboring blocks are coded in intra mode, even sub-blocks at the left or above the PU/CU boundary cannot perform OBMC.

4. Example Methods for OBMC Based on Spatial Neighbors

Embodiments of the presently disclosed technology overcome the drawbacks of existing implementations, thereby providing video coding with higher coding efficiencies. The OBMC process based on temporally neighboring blocks, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Example 1. In one example, the generation of prediction block of one block depends on motion information of temporal neighboring blocks in addition to the motion information associated with the current block.

Example Usage of Proposed Methods (a) In one example, motion information of temporal neighboring blocks (named temporal motion information for short) is used in the OBMC process to generate $P_N$.

(b) In one example, for a block coded with sub-block based coding tools (e.g., ATMVP), the generation of final prediction block for a sub-block may depend on the motion information of temporal neighboring blocks in addition to its own motion information, motion information from its surrounding sub-blocks.

(c) Alternatively, the usage of temporal motion information could only be applied to blocks coded without sub-block coding tools, e.g., all sub-blocks within the PU/CU have identical motion information.

Figure 18:
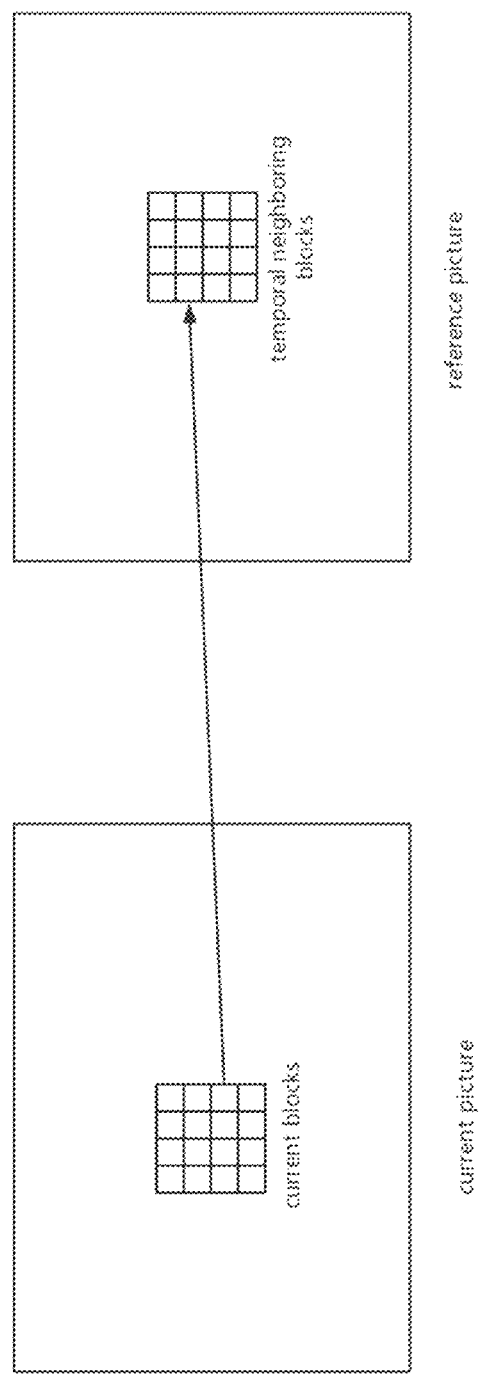
FIG. 18 shows an example of temporally neighboring blocks of a current block.
Figure 19B:
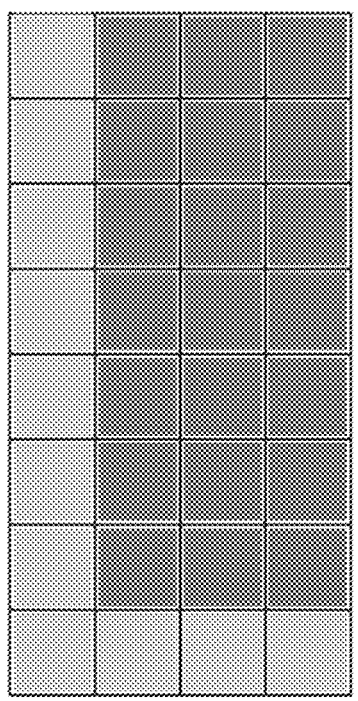
FIGS. 19A and 19B examples of motion information from spatially and temporally neighboring blocks used for OBMC of a prediction unit (PU) or coding unit (CU).
Figure 19A:
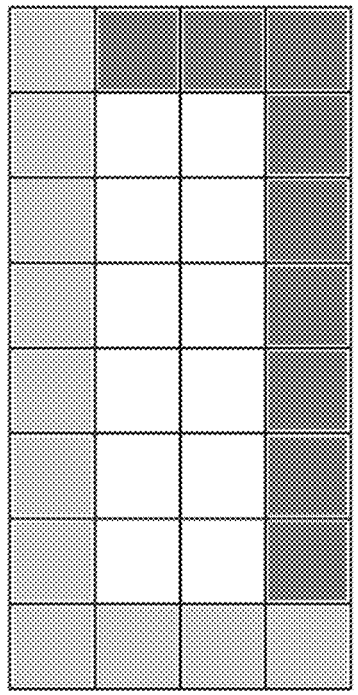

(d) In one example, motion information of temporal neighboring blocks (as shown in FIG. 18) may be used to generate the final prediction blocks for partial of the current block. In another example, for the down-right area of the PU/CU as shown in FIGS. 19A and 19B, temporal motion information may be utilized.

(e) In one example, usage of the temporal motion information in OBMC process may further depend on the availability of motion information of spatial neighboring blocks. In one example, if left and/or above neighboring blocks/sub-blocks of the PU/CU is intra coded, motion information of temporal neighboring blocks may be used to generate $P_N$ for the left/above boundary of the PU.

(f) In one example, the proposed method may be automatically disabled if the current block's motion information is derived from the same temporal neighboring block, e.g., the current block is coded with merge mode, its motion information is from the TMVP process, and the temporal neighboring blocks defined in the proposed method are the col-located temporal neighboring block in the collocated picture used for TMVP process.

Example Embodiments of Temporally Neighboring Blocks (g) In one example, temporal neighboring blocks are located in the collocated picture signaled in SPS/PPS/VPS or slice header.
  (i) Alternatively, temporal neighboring blocks are located in a predefined reference picture. For example, the first reference picture in list 0 or list 1.
  (ii) Alternatively, temporal neighboring blocks are located in one or multiple reference pictures and indications of these pictures are signaled in SPS/PPS/VPS or slice header.

(h) In one example, temporal neighboring blocks are the collocated blocks in the selected reference pictures. Alternatively, temporal neighboring blocks are identified by MV or scaled MV of the current PU/CU.
  (i) In one example, if the selected reference picture for identifying temporal neighboring blocks is in reference picture list X of the current picture, then MV (scaled if necessary) of list X is used to identify the temporal neighboring blocks. If MV of list X is unavailable, then MV (scaled if necessary) of list 1-X is used to identify the temporal neighboring blocks.
  (ii) In one example, if the selected reference picture for identifying temporal neighboring blocks is in both reference picture list 0 and list 1 of the current picture, then MV of list 0 (1) is first checked and then MV of list 1 (0) is checked. The first available MV (scaled if necessary) is used to identify the temporal neighboring blocks.
  (iii) In one example, if the selected reference picture for identifying temporal neighboring blocks is the same with a reference picture of current PU, then MV pointing to that reference picture is used to identify the temporal neighboring blocks.
  (i) In one example, motion vectors of temporal neighboring blocks are scaled to the same reference pictures of the current PU/CU, and then are used for OBMC.
    (i) Alternatively, motion vectors of temporal neighboring blocks are scaled to some predefined reference pictures, e.g., the first reference picture in list 0 or list 1.
    (ii) Alternatively, motion vectors of temporal neighboring blocks are scaled to one or multiple reference pictures signaled in SPS/PPS/VPS or slice header.

Example 2. In one example, the generation of prediction blocks of one block may rely on motion information of current block and intra prediction modes of a neighboring block.

(a) In one example, in the OBMC process, if the current PU/CU is coded with inter mode, and its neighboring block/sub-block is coded with intra mode, the reconstructed samples and the intra mode of the neighboring block/sub-block is used to generate $P_N$ for the corresponding above/left PU boundary block/sub-block (or the entire PU). Then, OBMC is performed.

Example 3. In one example, the generation of prediction blocks of one block may rely on motion information of neighboring blocks and intra prediction modes of the current block.

(a) Alternatively, if the current PU/CU is coded with intra mode, and its neighboring block/sub-block is coded with inter mode, motion information of neighboring block/sub-block is used to generate $P_N$ for the corresponding above/left PU/CU boundary block/sub-block (or the entire PU).
  (i) Alternatively, in addition, motion information of spatial neighboring block/sub-block is used to generate $P_N$ for the above/left PU/CU boundary sub-blocks, while motion information of temporal neighboring blocks/sub-blocks are used to generate $P_N$ for other sub-blocks.

(b) Alternatively, if the current PU/CU is coded with intra mode, and its neighboring block/sub-block is also coded with intra mode, the reconstructed samples and the intra mode of the neighboring block/sub-block is used to generate $P_N$ for the corresponding above/left PU/CU boundary block/sub-block (or the entire PU).

(i) Alternatively, in addition, motion information of temporal neighboring block/sub-block is used to generate $P_N$ for all sub-blocks that are not at the above/left PU/CU boundary.

(ii) Alternatively, motion information of temporal neighboring blocks is used to generate $P_N$ for the entire PU/CU.

Example 4. It is proposed that the weighting factor of $P_N$ in OBMC is different when is generated by MVs of spatial neighboring blocks (the weighting factor is denoted by W1), temporal MVs as claimed in item 1 (the weighting factor is denoted by W2), or intra-prediction as claimed in item ⅔ (the weighting factor is denoted by W3).

(a) In one example, W1>W2>W3.
  (b) Alternatively, W2=W3.
  (c) Alternatively, weights may further depend on other information, such as the distance of a row/column to the block boundary, block size/block shape/coded modes, etc.
  (d) Weights used to prediction blocks generated by temporal motion information or intra modes may be signaled in VPS/SPS/PPS/Slice header or pre-defined.

Example 5. It is proposed that the weighting factor of $P_N$ in OBMC is dependent on the difference (denoted by $P_{diff}$) between $P_N$ and $P_C$.

(a) In one example, weighting factors may be adaptively selected from a predefined weighting factor set (like {1/32, 1/16, 1/8, 1/4, 1/2}).
  (b) In one example, individual weight is assigned to each pixel, larger weight (i.e., closer to ½) $W_N$ is assigned to $P_N$ for smaller $|P_{diff}|$ and vice versa (the weight of PC denoted by $W_C$ is equal to $1-W_N$).
  (c) In one example, one same weight is assigned to a group of pixels.
    (i) In one example, one column/line is a group.
    (ii) In one example, several columns/lines are a group.
    (iii) In one example, a sub-block with size M×N is a group, wherein M and N are positive integers.
    (iv) In one example, pixels with similar values are grouped together. For example, pixels with $P_C$ (or $P_N$) value in the range of $[V_{max}^i\ V_{min}^i]$ forms the ith group.
    (v) In one example, pixels with similar $P_{diff}$ are grouped together. For example, pixels with $|P_{diff}|$ value in the range of $[V_{max}^i\ V_{min}^i]$ forms the ith group.
    ($v_1$) In one example, the weight depends on the average $|P_{diff}|$ of all pixels within the group, and a larger weight is assigned to $P_N$ for a smaller average $|P_{diff}|$.
    (vii) In one example, OBMC is disabled when $P_N$ is quite different from Pc, for example, average of $|P_{diff}|$ is larger than a threshold T, wherein T>0.
    (viii) Alternatively, the weighting factor is not selected from a predefined set, but is calculated as a function of the pixel position and $|P_{diff}|$.
  (d) In one example, the weight is the same for all $P_N$ predicted from one same neighboring motion information, and it depends on the difference between the neighboring motion information and the current motion information.
    (i) In one example, if the neighboring motion and the current motion uses different reference pictures, a larger/smaller weight is assigned to $P_N$.
    (ii) In one example, if the neighboring motion and the current motion uses same reference pictures, but the motion vectors are quite different, a larger/smaller weight is assigned to PN.

Example 6. The proposed methods may be applied to certain modes, block sizes/shapes, and/or certain sub-block sizes.

(a) The proposed methods may be applied to certain modes, such as conventional translational motion (e.g., affine mode is disabled).
  (b) The proposed methods may be applied to certain block sizes.
    (i) In one example, it is only applied to a block with w×h≥T, where w and h are the width and height of the current block.
    (ii) In another example, it is only applied to a block with w≥T && h≥T.
  (c) Usage of the proposed method may be invoked under further conditions, e.g., based on block sizes/block shapes/coded modes/slice types/low delay check flags/temporal layers, etc.

Example 7. In one example, the proposed methods may be applied on all color (or chroma) components. Alternatively, they may be applied only to some color components. For example, they may be only applied on the luma component.

Example 8. In one example, whether to and how to apply the proposed methods can be signaled from the encoder to the decoder in VPS/SPS/PPS/slice header/CTU/CU/group of CTUs/group of CUs.

The examples described above may be incorporated in the context of the method described below, e.g., method 2000, which may be implemented at a video decoder or a video encoder.

Figure 20A:
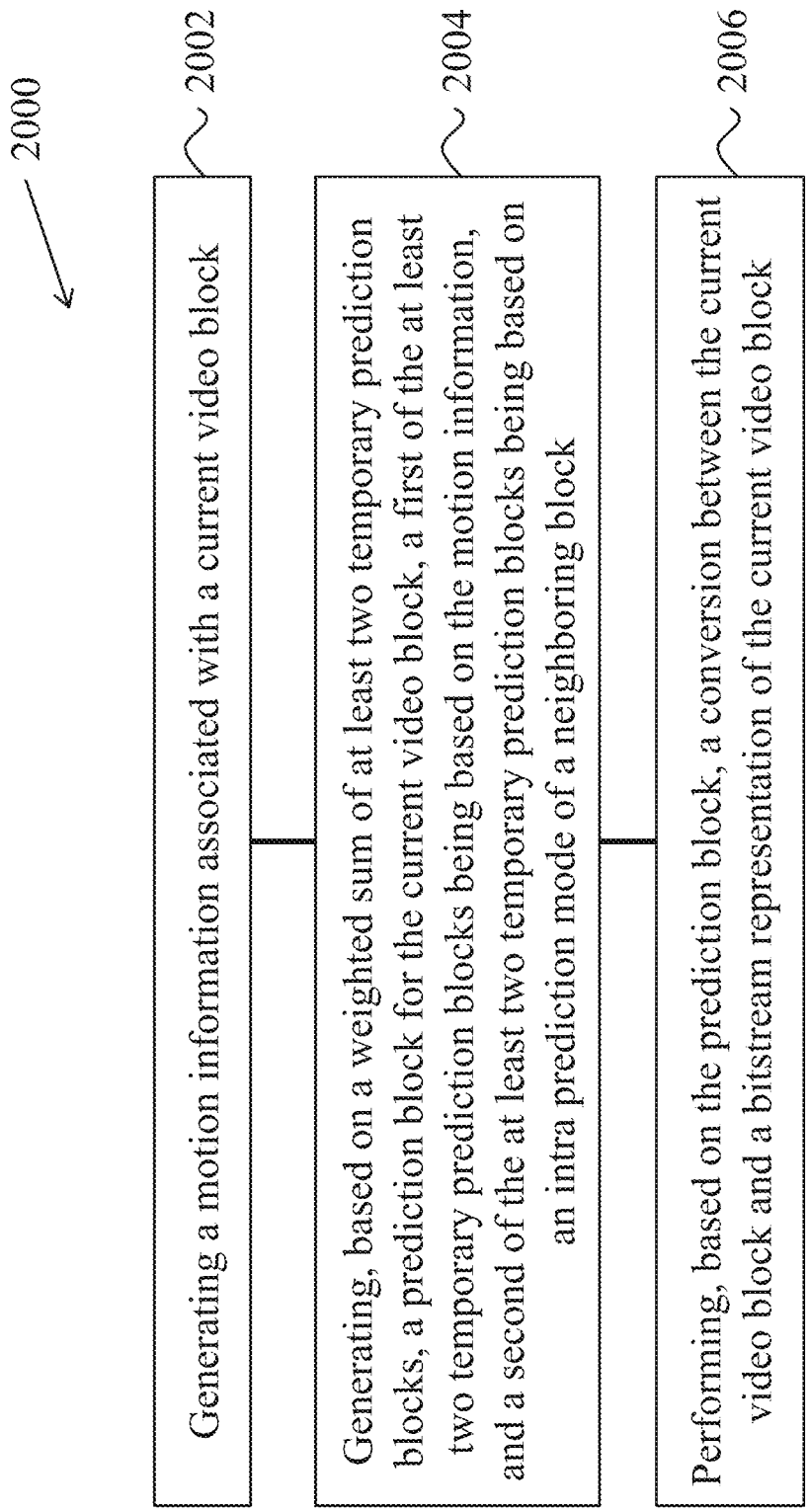

FIG. 20A shows a flowchart of an exemplary method 2000 for video processing. The method 2000 includes, at step 2002, generating a motion information associated with a current video block.

The method 2000 includes, at step 2004, generating, based on a weighted sum of at least two temporary prediction blocks, a prediction block for the current video block, a first of the at least two temporary prediction blocks being based on the motion information, and a second of the at least two temporary prediction blocks being based on an intra prediction mode of a neighboring block.

The method 2000 includes, at step 2006, performing, based on the prediction block, a conversion between the current video block and a bitstream representation of the current video block.

FIG. 20B shows a flowchart of an exemplary method 2030 for video processing. The method 2030 includes, at step 2032, generating, based on a weighted sum of a at least two temporary prediction blocks, a prediction block for a current video block, a first of the at least two temporary prediction blocks being based on an intra prediction mode of the current video block, and a second of the at least two temporary prediction blocks being based on a motion information associated with at least one neighboring block.

The method 2030 includes, at step 2034, performing, based on the prediction block, a conversion between the current video block and a bitstream representation of the current video block.

FIG. 20C shows a flowchart of an exemplary method 2060 for video processing. The method 2060 includes, at step 2062, generating, based on a weighted sum of a first prediction sample and a second prediction sample, a prediction block, the first prediction sample being based on a first motion information associated with a current video block, the second prediction sample being based on a second motion information associated with at least one neighboring block of the current video block, and a weighting factor of the second prediction sample being based on a difference between the first prediction sample and the second prediction sample.

The method 2060 includes, at step 2064, performing, based on the prediction block, a conversion between the current video block and a bitstream representation of the current video block.

In the methods described herein, in some embodiments, the conversion may include encoding the video block and video to generate a coded representation or a bitstream. In some embodiments, the conversion may include decoding a coded representation or bitstream to generate pixel values of the video block. In some embodiments, the conversion may be a transcoding operation in which bitrate or format of video representation is changed.

5. Example Implementations of the Disclosed Technology

Figure 21:
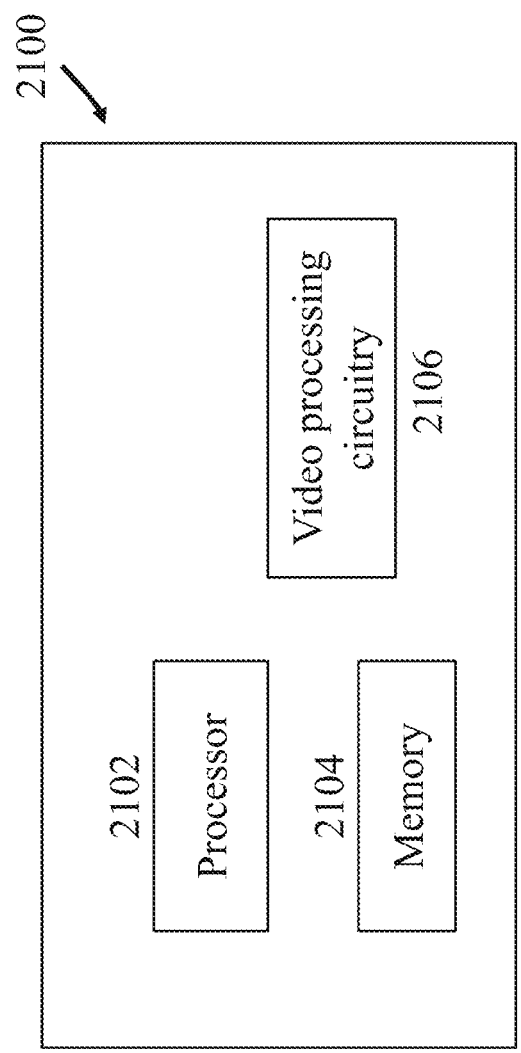
FIG. 21 is a block diagram of an example of a hardware platform for implementing a visual media decoding or a visual media encoding technique described in the present document.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods (including, but not limited to, method 2000) described in the present document. The memory (memories) 2104 may be used for storing data and code used for implementing the methods and techniques described herein. The video processing hardware 2106 may be used to implement, in hardware circuitry, some techniques described in the present document.

Figure 22:
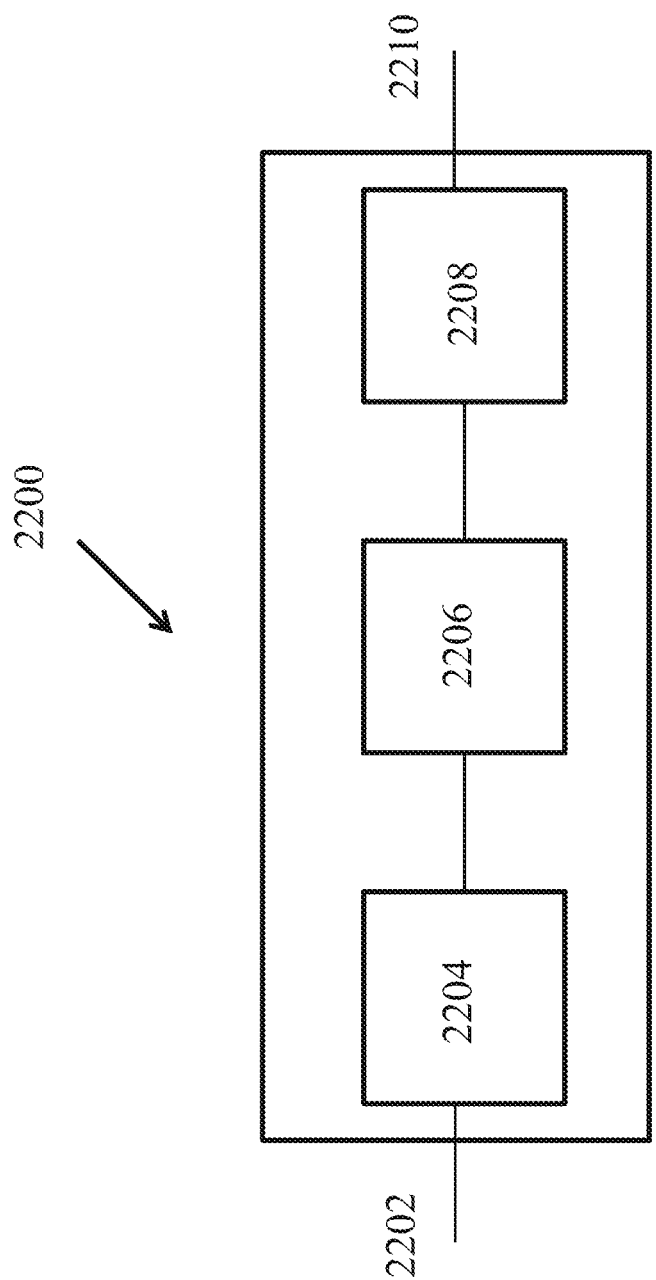
FIG. 22 is a block diagram of an example video processing system in which disclosed techniques may be implemented.

FIG. 22 is a block diagram showing an example video processing system 2200 in which various techniques disclosed herein may be implemented. Various implementations may include some or all of the components of the system 2200. The system 2200 may include input 2202 for receiving video content. The video content may be received in a raw or uncompressed format, e.g., 8 or 10 bit multi-component pixel values, or may be in a compressed or encoded format. The input 2202 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2200 may include a coding component 2204 that may implement the various coding or encoding methods described in the present document. The coding component 2204 may reduce the average bitrate of video from the input 2202 to the output of the coding component 2204 to produce a coded representation of the video. The coding techniques are therefore sometimes called video compression or video transcoding techniques. The output of the coding component 2204 may be either stored, or transmitted via a communication connected, as represented by the component 2206. The stored or communicated bitstream (or coded) representation of the video received at the input 2202 may be used by the component 2208 for generating pixel values or displayable video that is sent to a display interface 2210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 21.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   generating, based on a weighted sum of a first prediction sample and a second prediction sample, a prediction block, wherein the first prediction sample is based on a first motion information associated with a current video block, wherein the second prediction sample is based on a second motion information associated with at least one neighboring block of the current video block, wherein a weighting factor, used for the weighted sum of the first prediction sample and the second prediction sample, of the second prediction sample is based on a difference between the first prediction sample and the second prediction sample, and wherein the weighting factor for the second prediction sample is increased to $\frac{1}{2}$ upon a determination that the difference between the first prediction sample and the second prediction sample is decreasing to zero; and
   performing, based on the prediction block, a conversion between the current video block and a bitstream of the current video block.

2. The method of claim 1, wherein the weighting factor for the first prediction sample or the weighting factor for the second prediction sample is selected from a predefined weighting factor set, and wherein the predefined weighting factor set is $\{\frac{1}{32}, \frac{1}{16}, \frac{1}{8}, \frac{1}{4}, \frac{1}{2}\}$.

3. The method of claim 1, wherein a same weighting factor is assigned to a group of pixels in the current video block, and
   wherein the group of pixels comprises pixels in one or more columns of the current video block or pixels in one or more rows of the current video block; or
   wherein the group of pixels is a subblock of the current video block, wherein a size of the subblock is M×N, and wherein M and N are positive integers; or
   wherein the group of pixels comprises pixels with values in a range [Vmax, Vmin], and wherein Vmax and Vmin are positive integers.

4. The method of claim 3, wherein each of the group of pixels is associated with a corresponding first prediction sample and a corresponding second prediction sample, and
   wherein the group of pixels comprises pixels with the difference between the corresponding first prediction sample and the corresponding second prediction sample being within a range [Vmax, Vmin], and wherein Vmax and Vmin are positive integers; or alternatively
   wherein each of the group of pixels is associated with a corresponding first prediction sample and a corresponding second prediction sample, and wherein the same weighting factor is based on an average value of the difference between the corresponding first prediction sample and the corresponding second prediction sample for all pixels in the group of pixels.

5. The method of claim 1, wherein an absolute value of a difference between the first prediction sample and the second prediction sample is less than or equal to a threshold that is greater than zero.

6. The method of claim 1, wherein the weighting factor for the first prediction sample or the weighting factor for the second prediction sample is based on a pixel position and a value of the difference between the first prediction sample and the second prediction sample, or alternatively, wherein the weighting factor of the second prediction sample is further based on a difference between the first motion information and the second motion information.

7. The method of claim 1, wherein performing the conversion is based on a coding mode of the current video block, a size or a shape of the current video block, or a size of a sub-block of the current video block, and wherein the coding mode of the current video block comprises a conventional translation motion with an affine mode being disabled; or wherein a product of a height of the current video block and a width of a current video block is greater than or equal to a threshold; or wherein a height of the current video block is greater than or equal to a first threshold, and wherein a width of the current video block is greater than or equal to a second threshold.

8. The method of claim 7, wherein performing the conversion is further based on a slice type of a slice comprising the current video block, a low-delay check flag or a temporal layer, and wherein performing the conversion is further based on signaling in a sequence parameter set (SPS), a picture parameter set (PPS), a video parameter set (VPS), a slice header, a coding tree unit (CTU), a coding unit (CU), a group of CTUs or a group of CUs.

9. The method of claim 1, wherein the performing the conversion comprises applying a motion compensation process on a luma component of the current video block, and applying the motion compensation process on one or more of a plurality of chroma components of the current video block.

10. The method of claim 1, wherein the at least one neighboring block comprises four neighboring blocks, and wherein the generating the prediction block is part of an overlapped block motion compensation (OBMC) process.

11. The method of claim 1, further comprising:
generating, based on a weighted sum of at least two temporary prediction blocks, a prediction block for the current video block, wherein a first of the at least two temporary prediction blocks is based on the first motion information associated with the current video block, and wherein a second of the at least two temporary prediction blocks is based on an intra prediction mode of the at least one neighboring block of the current video block.

12. The method of claim 11, wherein a current prediction unit (PU) or coding unit (CU), comprising the current video block, is coded with an inter prediction mode, and wherein the at least one neighboring block is coded with the intra prediction mode.

13. The method of claim 1, further comprising:
generating, based on a weighted sum of a at least two temporary prediction blocks, a prediction block for a current video block, wherein a first of the at least two temporary prediction blocks is based on an intra prediction mode of the current video block, and wherein a second of the at least two temporary prediction blocks is based on the second motion information associated with the at least one neighboring block of the current video block.

14. The method of claim 13, wherein a current prediction unit (PU) or coding unit (CU), comprising the current video block, is coded with the intra prediction mode, and wherein the at least one neighboring block is coded with an inter prediction mode or coded with another intra prediction mode.

15. The method of claim 1, wherein performing the conversion comprises encoding the current video block into the bitstream.

16. The method of claim 1, wherein performing the conversion comprises decoding the current video block from the bitstream.

17. An apparatus for video processing comprising a processor and a non-transitory memory with instructions thereon, wherein the instructions upon execution by the processor, cause the processor to:
generate, based on a weighted sum of a first prediction sample and a second prediction sample, a prediction block, wherein the first prediction sample is based on a first motion information associated with a current video block, wherein the second prediction sample is based on a second motion information associated with at least one neighboring block of the current video block, wherein a weighting factor, used for the weighted sum of the first prediction sample and the second prediction sample, of the second prediction sample is based on a difference between the first prediction sample and the second prediction sample, and wherein the weighting factor for the second prediction sample is increased to ½ upon a determination that the difference between the first prediction sample and the second prediction sample is decreasing to zero; and
perform, based on the prediction block, a conversion between the current video block and a bitstream of the current video block.

18. The apparatus of claim 17, wherein the weighting factor for the first prediction sample or the weighting factor for the second prediction sample is selected from a predefined weighting factor set, and wherein the predefined weighting factor set is {1/32, 1/16, 1/8, 1/4, 1/2}.

19. A non-transitory computer-readable storage medium storing instructions that cause a processor to:
generate, based on a weighted sum of a first prediction sample and a second prediction sample, a prediction block, wherein the first prediction sample is based on a first motion information associated with a current video block, wherein the second prediction sample is based on a second motion information associated with at least one neighboring block of the current video block, wherein a weighting factor, used for the weighted sum of the first prediction sample and the second prediction sample, of the second prediction sample is based on a difference between the first prediction sample and the second prediction sample, and wherein the weighting factor for the second prediction sample is increased to ½ upon a determination that the difference between the first prediction sample and the second prediction sample is decreasing to zero; and
perform, based on the prediction block, a conversion between the current video block and a bitstream of the current video block.

20. A non-transitory computer-readable recording medium storing a bitstream which is generated by a method performed by a video processing apparatus, wherein the method comprises:
generating, based on a weighted sum of a first prediction sample and a second prediction sample, a prediction block, wherein the first prediction sample is based on a first motion information associated with a current video block, wherein the second prediction sample is based on a second motion information associated with at least one neighboring block of the current video block, wherein a weighting factor, used for the weighted sum of the first prediction sample and the second prediction sample, of the second prediction sample is based on a difference between the first prediction sample and the second prediction sample, and wherein the weighting factor for the second prediction sample is increased to ½ upon a determination that the difference between the first prediction sample and the second prediction sample is decreasing to zero; and generating, based on the prediction block, the bitstream from the current video block.

\* \* \* \* \*